(12) United States Patent
Georgoulias et al.

(10) Patent No.: US 8,925,643 B2
(45) Date of Patent: Jan. 6, 2015

(54) AERATOR WITH CORING DEPTH ADJUSTMENT

(75) Inventors: Chris Michael Georgoulias, Raleigh, NC (US); Bradley P. Aldridge, Raleigh, NC (US); Stanley K. Hall, Godwin, NC (US); Shane Simon, Cascade, IA (US); Allen J. Takes, Cascade, IA (US); Randall G. Peters, Mayville, WI (US)

(73) Assignee: Deere & Company, Moline, IL (US)

( * ) Notice: Subject to any disclaimer, the term of this patent is extended or adjusted under 35 U.S.C. 154(b) by 228 days.

(21) Appl. No.: 13/435,170

(22) Filed: Mar. 30, 2012

(65) Prior Publication Data

US 2013/0255979 A1    Oct. 3, 2013

(51) Int. Cl.
*A01B 45/00* (2006.01)

(52) U.S. Cl.
USPC .......................................................... 172/21

(58) Field of Classification Search
CPC ....... A01B 45/00; A01B 45/02; A01B 45/023
USPC .................................................... 172/21, 22
See application file for complete search history.

(56) References Cited

U.S. PATENT DOCUMENTS

| | | | |
|---|---|---|---|
| 2,236,562 A * | 4/1941 | Brandes | 172/22 |
| 4,602,687 A | 7/1986 | Hansen | |
| 4,606,411 A | 8/1986 | Classen | |
| 4,645,012 A | 2/1987 | Hansen et al. | |
| 4,662,456 A | 5/1987 | Classen | |
| 4,750,565 A | 6/1988 | Hansen et al. | |
| 4,753,298 A | 6/1988 | Hansen et al. | |
| 4,776,404 A | 10/1988 | Rogers et al. | |
| 4,819,734 A * | 4/1989 | Classen | 172/22 |
| 4,867,244 A | 9/1989 | Cozine et al. | |
| 5,119,880 A * | 6/1992 | Zehrung et al. | 172/22 |
| 5,207,168 A * | 5/1993 | Comer | 111/200 |
| 5,207,278 A | 5/1993 | Hatlen | |
| 5,570,746 A | 11/1996 | Jones et al. | |
| 5,709,272 A | 1/1998 | Jones et al. | |
| 6,041,869 A | 3/2000 | Lewis et al. | |
| 6,102,129 A | 8/2000 | Classen | |
| 6,199,637 B1 * | 3/2001 | Wiedenmann | 172/21 |
| 6,561,282 B2 | 5/2003 | Smith | |
| 6,948,568 B2 | 9/2005 | Banks | |
| 7,096,969 B2 | 8/2006 | Petersen et al. | |
| 7,267,181 B2 | 9/2007 | Banks | |
| 7,293,612 B1 | 11/2007 | Petersen et al. | |

(Continued)

FOREIGN PATENT DOCUMENTS

DE    29607530 U1    2/1997
DE    19630961 A1 *  2/1998

(Continued)

OTHER PUBLICATIONS

European Search Report dated Jun. 28, 2013 (18 pages).

*Primary Examiner* — Jamie L McGowan

(57) ABSTRACT

An aerator with coring depth adjustment includes a coring depth adjust rod centrally positioned between a left side and a right side of the coring head. A portion of the coring depth adjust rod is threaded to a frame member of the coring head, and a base of the rod abuts a stop on a frame member of the aerator. The coring depth adjust rod rotates to raise and lower the coring head relative to the aerator frame to vary the coring depth.

14 Claims, 4 Drawing Sheets

(56) References Cited

U.S. PATENT DOCUMENTS

| | | |
|---|---|---|
| 7,472,759 B2 | 1/2009 | Petersen |
| 7,669,667 B2 | 3/2010 | Petersen et al. |
| 7,730,960 B1 | 6/2010 | Knight et al. |
| 8,376,062 B2 * | 2/2013 | Wiedenmann .................. 172/21 |
| 8,424,613 B2 * | 4/2013 | Hurley ............................ 172/21 |
| 8,561,713 B2 * | 10/2013 | De Bree ......................... 172/21 |
| 2005/0023009 A1 | 2/2005 | Banks |
| 2005/0178567 A1 * | 8/2005 | Wiedenmann .................. 172/21 |
| 2009/0107689 A1 * | 4/2009 | Petersen et al. ................ 172/22 |
| 2011/0005783 A1 | 1/2011 | Livingstone |
| 2011/0213530 A1 | 9/2011 | Hunt et al. |
| 2011/0288729 A1 | 11/2011 | McKinney |
| 2013/0075117 A1 * | 3/2013 | Hall et al. ....................... 172/22 |

FOREIGN PATENT DOCUMENTS

| | | |
|---|---|---|
| DE | 102005021025 B4 * | 2/2012 |
| EP | 0861578 | 9/1996 |
| EP | 0861578 | 10/2001 |
| WO | 20040043132 A2 | 5/2004 |
| WO | 2004016070 | 8/2004 |

* cited by examiner

AERATOR WITH CORING DEPTH ADJUSTMENT

FIELD OF THE INVENTION

This invention relates to aerators for aerating ground surfaces. More specifically, the invention relates to walk-behind aerators having coring heads with a plurality of tines that repeatedly penetrate the ground surface.

BACKGROUND OF THE INVENTION

Aerators are commonly used for maintaining landscaped ground surfaces including turf. The term "turf" refers to grass and other material which is specifically grown for sporting activities and is used, for example, to form golf course greens. Aerators on these types of surfaces have a coring head with tines that repeatedly penetrate the ground surface, forming a plurality of holes so that the ground surface is aerated, to improve growth of the grass or other material and enhance the condition of the surface for playing purposes.

Aerators may have flywheels that drive the upper ends of tine supports in a circular path, and the lower ends in a reciprocating motion of repeated penetrations into the ground. Link arms can pivot to compensate for forward motion of the machine. At each part of the cycle when the tines are withdrawn from the ground surface, the link arms may position the tines in a substantially vertical position for the next cycle of penetration into the ground. Tines are generally cylindrical, are hollow or solid, and produce holes by pulling up plugs or cylindrical cores of soil as the tines move by rotation of the flywheel.

The depth of penetration by the tines, or coring depth, may be controlled by the vertical position of the coring head on the aerator. For example, the coring head may be supported by stops on vertically oriented depth pins located on each side of the aerator frame. Depth adjustment may be achieved by stacking spacers on each stop, with the quantity or thickness of the spacers setting the coring depth. However, depth adjustment requires significant down time to arrange multiple spacers.

There is a need for an aerator with coring depth adjustment that is simple and easy to operate, that does not require significant down time, and that does not require arranging multiple spacers or other parts that must be relocated. Additionally, there is a need for an aerator with coring depth adjustment that can help remove tines that may become stuck in the ground.

SUMMARY OF THE INVENTION

An aerator with coring depth adjustment includes a coring depth adjust rod supporting the coring head relative to the aerator frame and that rotates on a vertical axis to change the coring depth of the tines. The aerator with coring depth adjustment is simple and easy to operate, does not require significant down time, and does not require arranging multiple spacers or other parts that must be relocated. The aerator with coring depth adjustment also can help remove tines that may become stuck in the ground.

DESCRIPTION OF THE PREFERRED EMBODIMENT

Figure 1:
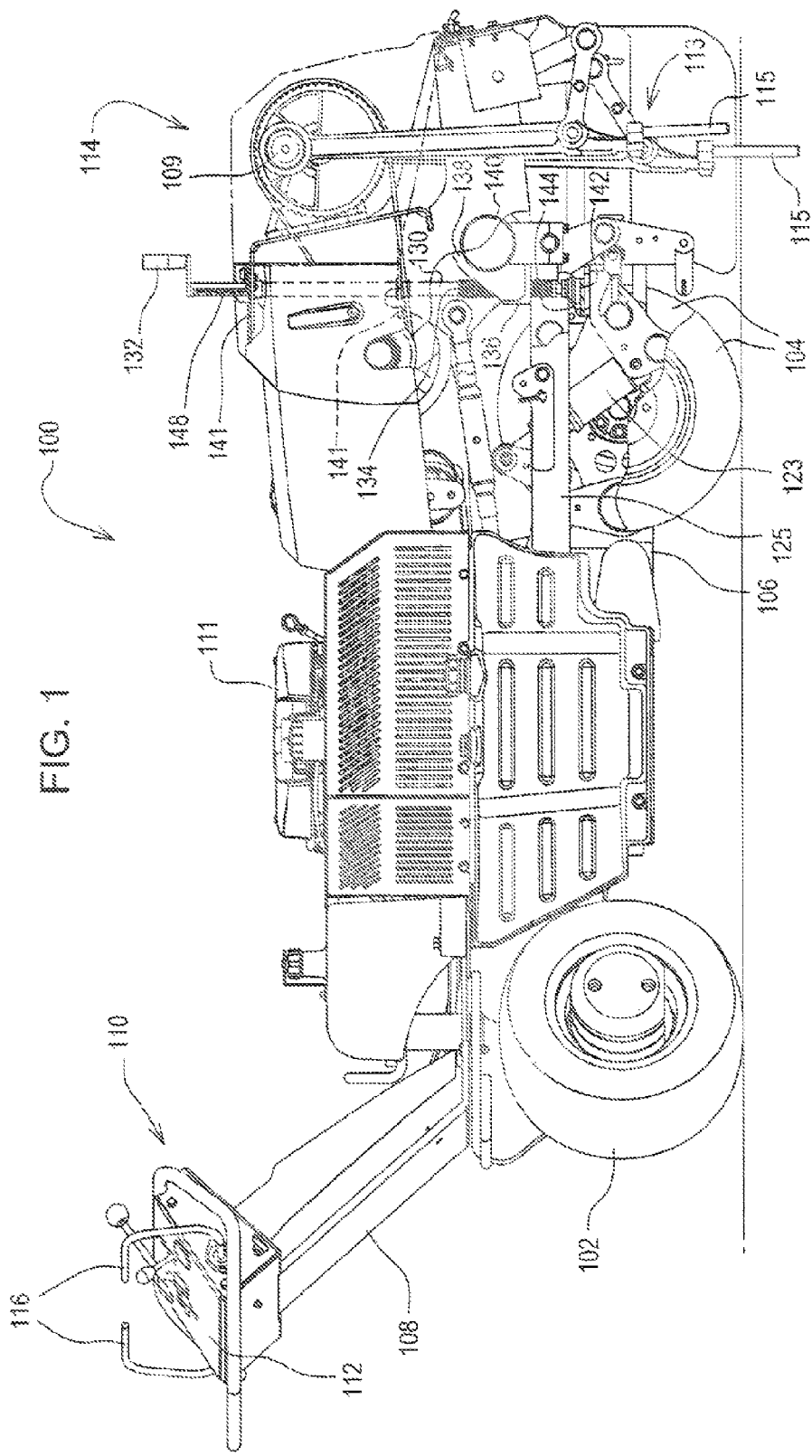
FIG. 1 is a side view, partially in section, of an aerator with coring depth adjustment at a first coring depth setting according to a preferred embodiment of the invention.

In one embodiment shown in FIGS. 1-4, walk-behind aerator 100 may be supported for movement over the ground by a single steerable wheel 102, which may or may not be driven, and a pair of driven wheels 104. Frame 106 may have a neck 108 extending upwardly therefrom, and the single steerable wheel may be carried in a pivotal yoke that can rotate about a vertical pivot axis attached to the neck. An upwardly and forwardly extending handle assembly 110 may be coupled to the pivotal yoke that carries the front wheel, and may include control panel 112. An operator may walk ahead of the aerator and steer the vehicle by using the handle assembly to pivot the single steerable front wheel about the vertical pivot axis.

In one embodiment, coring head 114 may be mounted on the rear of the aerator, either behind the rear drive wheels and tires, between the rear drive wheels and tires, or adjacent the rear axle(s). The coring head may carry a plurality of tine assemblies 113 that reciprocate up and down by rotation of crankshaft 109. Each tine assembly may have a plurality of coring tines 115 that are driven into the ground and produce holes for the purpose of aerating the turf. Each tine assembly may include a rubber dampener system that absorbs the forward motion of the aerator to help improve hole quality by minimizing hole elongation.

In one embodiment, the aerator may have an internal combustion engine 111 supported on the frame that may be used to operate coring head 114. The internal combustion engine also may provide traction drive for the rear wheels through a mechanical transmission, or through a hydrostatic transmission with a pump to supply pressurized fluid to a single hydraulic motor or pair of hydraulic motors for rotating the rear wheels. Alternatively, the internal combustion engine may drive an alternator or generator to generate electric power for electric traction drive motors. For example, each electric traction drive motor may independently rotate each wheel.

In one embodiment, the operator may operate the traction drive to move the aerator forward or in reverse by moving traction bail 116 in either the forward or reverse direction. The traction bail may be a single lever or a pair of levers pivotably mounted to the sides of the operator controls on the handle assembly of the aerator. The traction bail may be biased to a central or neutral position when released by the operator.

The aerator described in this application may be provided with a hydrostatic traction drive that can move the machine in the forward direction at a coring ground speed while the coring head is operating, or in the reverse direction while the coring head is not operating. Additionally, the hydrostatic traction drive can move the aerator in the forward direction at a higher transport speed while the coring head is not operating. An operator typically may walk in front of the aerator as it moves in the forward direction. However, those skilled in the art will understand that the aerator with coring depth adjustment of this invention is not limited to aerators with the same forward and reverse designations used in this application, but is intended to include any other walk behind aerators.

Figure 2:
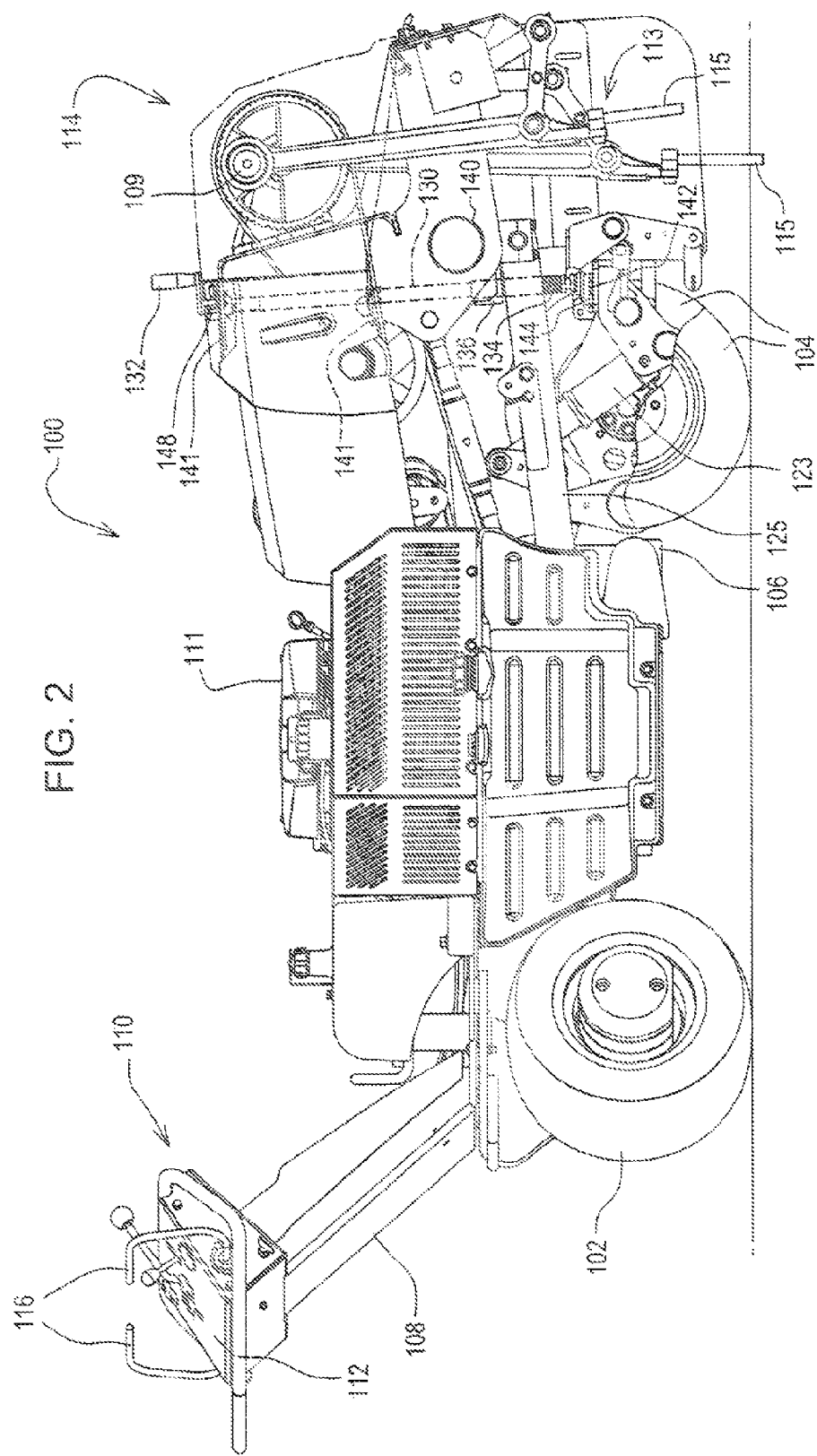
FIG. 2 is a side view, partially in section, of an aerator with coring depth adjustment at a second coring depth setting according to a preferred embodiment of the invention.
Figure 3:
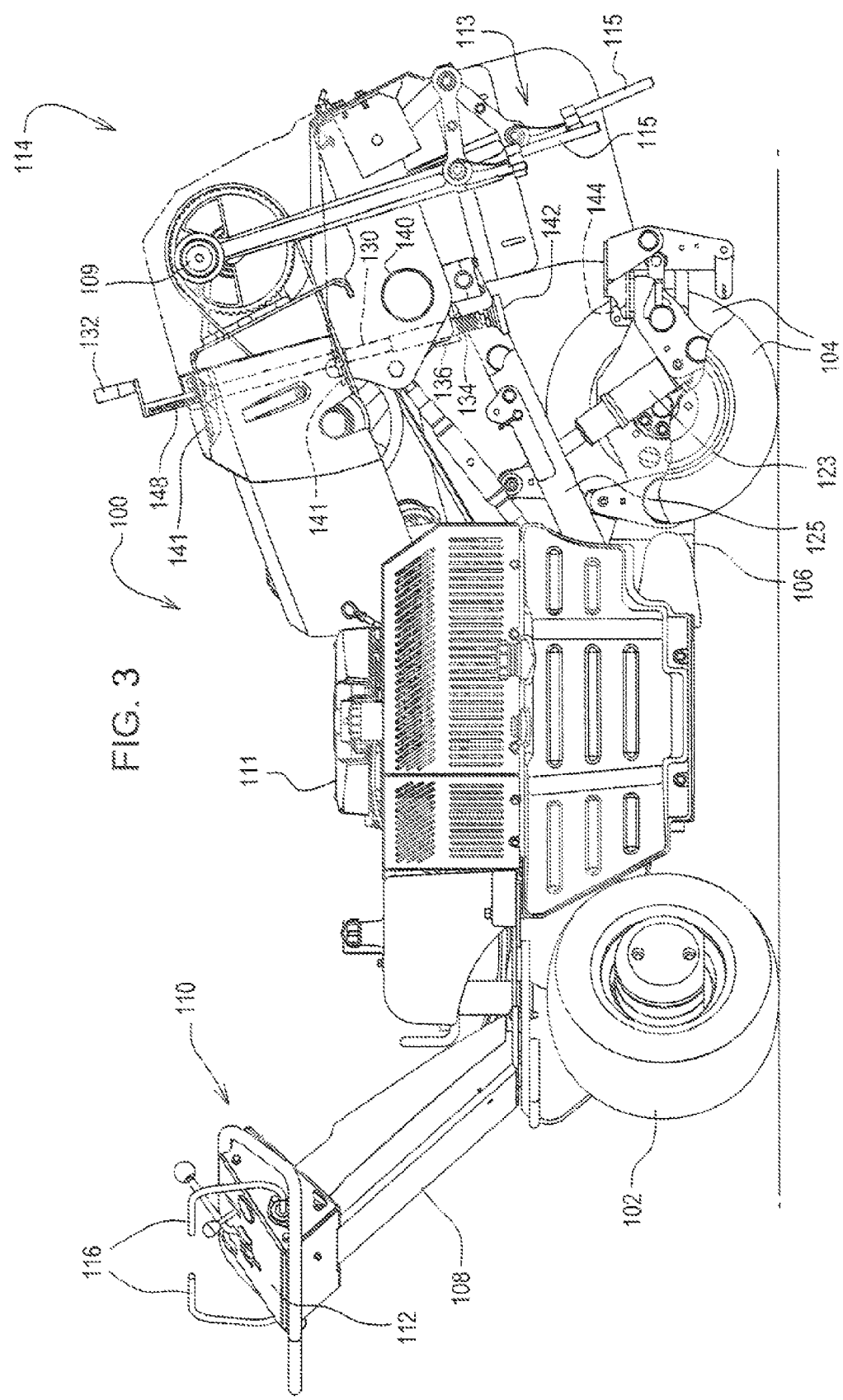
FIG. 3 is a side view, partially in section, of an aerator with coring depth adjustment with the coring head raised according to a preferred embodiment of the invention.
Figure 4:
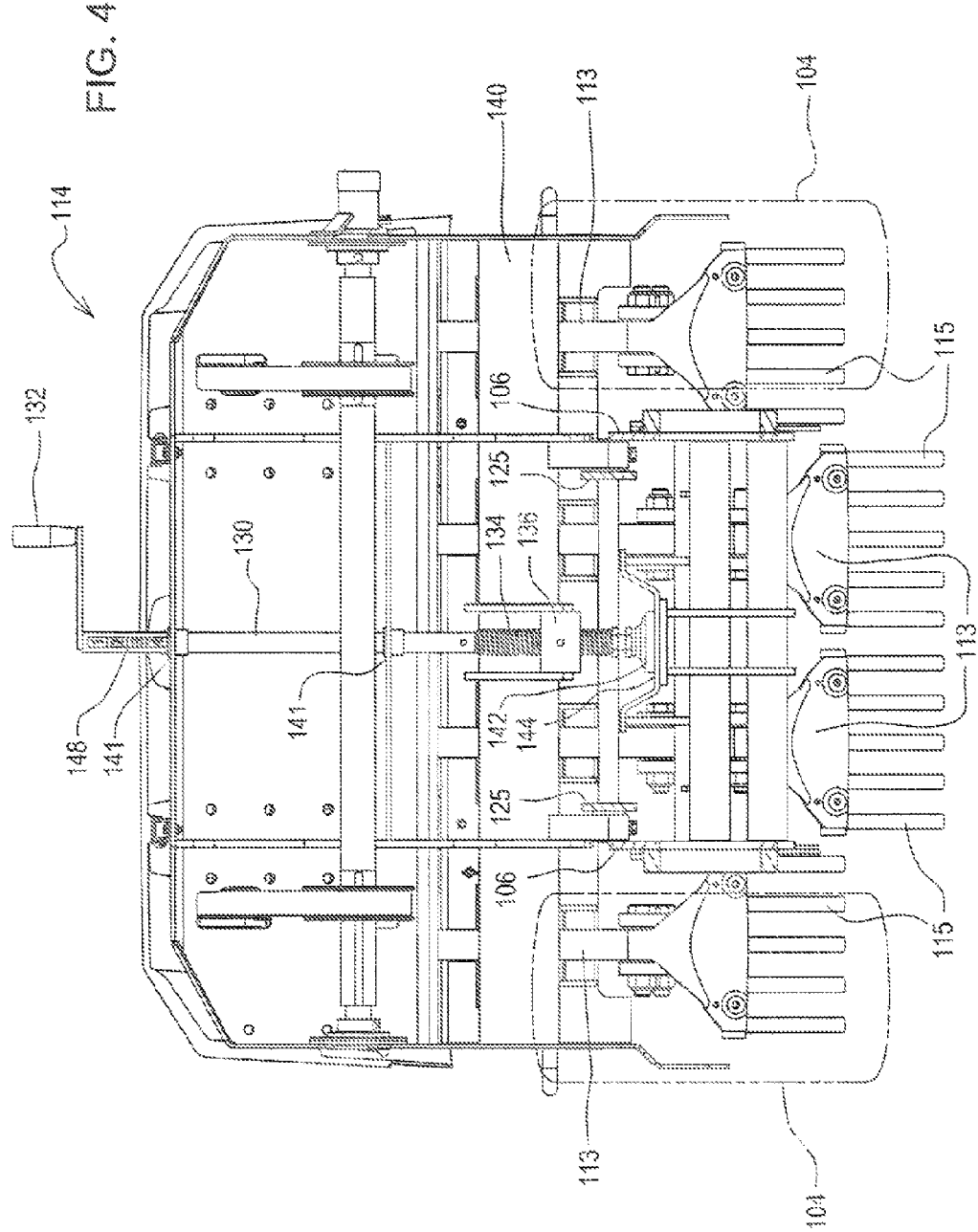
FIG. 4 is a rear view of a coring head of an aerator with coring depth adjustment according to a preferred embodiment of the invention.

In one embodiment, the aerator may include a hydraulic lift and lower system to raise the coring head to a transport position and lower the coring head to an operating or coring position. FIGS. 1 and 2 show the coring head in an operating or coring position, and FIG. 3 shows the coring head in the raised transport position. The system may include lift cylinder 123 connected between frame 106 and aerator support arm 125. An operator may actuate a switch on control panel 112 to raise and lower the coring head. In response to actuation of the switch, a signal may be provided to a hydraulic circuit that may extend or retract lift cylinder 123. Optionally, an electro hydraulic pump may be provided on the aerator to raise and lower the coring head using electric power.

In one embodiment, the aerator with coring depth adjustment may include coring depth adjust rod 130. The coring depth adjust rod may be generally vertically aligned and positioned at a location at or near the front of the coring head, where the coring head faces and is attached to the aerator frame. The coring depth adjust rod may be centrally positioned between the left and right sides of the aerator. Coring depth adjust handle 132 may be provided on the upper end of the coring depth adjust rod, and may be cranked by an operator to rotate the coring depth adjust rod on a generally vertical axis to raise and lower the coring head relative to the aerator frame, and thereby change the coring depth of the tines. Alternatively, part of the coring depth adjust rod may be non-vertical. For example, a first vertical portion of the coring depth adjust rod may be connected by a universal joint to a second non-vertical portion of the coring depth adjust rod.

In one embodiment, the coring depth adjust rod may be rotated to a plurality of different coring depth settings. For example, FIG. 1 shows the coring depth adjust rod with the tines at a first coring depth setting, and FIG. 2 shows the coring depth adjust rod with the tines at a second coring depth setting that is not as deep as the first coring depth setting.

In one embodiment, at least a portion of coring depth adjust rod 130 may include lead screw 134. The external threads of the lead screw may engage internal threads on one or more members of the coring head frame. For example, a lower part of the coring depth adjust rod may have external threads that engage internal threads on coring depth support block 136. The coring depth support block may be welded to brackets 138 that are welded to tubular cross member 140 of the coring head frame.

In one embodiment, coring depth adjust rod 130 may be a steel or other metal rod, preferably having a diameter of about 1 inch to about 2 inches, sufficient to support a coring head having a weight of approximately 500 pounds. At least part of the coring depth adjust rod may extend generally vertically through one or more openings and/or bushings in support members 141 of the coring head frame. The thread pitch on the lead screw may be selected so that each rotation of the coring depth adjust rod may raise or lower the coring head a specific vertical distance such as ⅝ inch, through a range of coring depths such as between about one inch and about four inches. Coring depth marks 148 may be provided on or affixed to the coring depth adjust rod. The coring depth of the tines may be indicated by the mark that is aligned with or corresponds to an opening or other feature marked on the coring head frame.

In one embodiment, the bottom or base of coring depth adjust rod 130 may be provided with foot 142 that abuts stop 144 on the aerator frame. For example, foot 142 may rest on stop 144 which may be a centrally located member between the left and right sides of the aerator frame. The operator may use the handle to rotate the coring depth adjust rod to raise or lower the coring head relative to the aerator frame. Additionally, the operator may rotate the coring depth adjust rod to crank the coring head up sufficiently to pull the tines out of the ground if they are stuck.

Having described the preferred embodiment, it will become apparent that various modifications can be made without departing from the scope of the invention as defined in the accompanying claims.

The invention claimed is:

1. An aerator with coring depth adjustment, comprising:
    a frame supported by a pair of wheels adjacent a first end and a steerable wheel adjacent a second end thereof;
    a coring head on the second end of the frame including a plurality of tines that reciprocate vertically to a coring depth during operation of the coring head; the coring head moveable between a lowered operating position and a raised transport position;
    a coring depth adjust rod having a generally vertical axis and being centrally positioned between a left side and a right side of the coring head; a portion of the coring depth adjust rod being threaded to a frame member of the coring head, and a base of the rod abutting a stop on a frame member of the aerator to support the coring head in the lowered operating position and off the stop in the raised transport position;
    the coring depth adjust rod rotating on its generally vertical axis to raise and lower the coring head relative to the aerator frame to vary the coring depth.

2. The aerator with coring depth adjustment of claim 1 further comprising a foot on the base of the coring depth adjust rod.

3. The aerator with coring depth adjustment of claim 1 further comprising a plurality of coring depth marks on the coring depth adjust rod.

4. The aerator with coring depth adjustment of claim 1 wherein the frame member of the coring head includes an internally threaded support block centrally positioned between a left side and a right side of the frame.

5. An aerator with coring depth adjustment, comprising:
    a coring head mounted on an aerator frame and having a plurality of tine assemblies holding tines that are driven into the ground to a coring depth in a reciprocating manner;
    a lift and lower system that raises the coring head to a transport position and lowers the coring head to a coring position; and
    a coring depth adjust rod supporting the coring head on a stop on the aerator frame in the coring position, is off the stop in the transport position, and that rotates on a vertical axis to change the coring depth of the tines.

6. The aerator with coring depth adjustment of claim 5 wherein the coring depth adjust rod is threaded to a frame member of the coring head.

7. The aerator with coring depth adjustment of claim 5 further comprising a handle on an end of the coring depth adjust rod to rotate the coring depth adjust rod.

8. The aerator with coring depth adjustment of claim 5 wherein the coring depth adjust rod is centrally positioned between a left side and a right side of the coring head.

9. An aerator with coring depth adjustment, comprising:
    a walk behind aerator frame;
    a coring head that is moveable relative to the frame between a raised transport position and a lowered coring position;
    a coring depth adjust rod supporting the coring head on the walk behind aerator frame; the coring depth adjust rod having an externally threaded area that engages an internally threaded area on the coring head frame, and having a base abutting a stop on the walk behind aerator frame in the lowered coring position, and up off the stop in the raised transport position;

the coring depth adjust rod being rotatable to raise and lower the coring head relative to the aerator frame in the lowered coring position.

10. The aerator with coring depth adjustment of claim 9, wherein a portion of the coring depth adjust rod has a generally vertical axis.

11. The aerator with coring depth adjustment of claim 9, wherein the coring depth adjust rod and the stop are centrally positioned between a left side and a right side of the walk behind aerator frame.

12. The aerator with coring depth adjustment of claim 9, wherein the internally threaded area is a threaded block welded to a cross member of the coring head frame.

13. The aerator with coring depth adjustment of claim 9, further comprising a crank on an end of the coring depth adjust rod.

14. The aerator with coring depth adjustment of claim 9, wherein the walk behind aerator frame includes a single steerable wheel.

* * * * *